United States Patent [19]

Cornelison

[11] 4,305,289
[45] Dec. 15, 1981

[54] SURFACE MOUNTED THERMOMETER

[75] Inventor: Richard C. Cornelison, Hiram, Ohio

[73] Assignee: Condar Co., Hiram, Ohio

[21] Appl. No.: 80,148

[22] Filed: Sep. 28, 1979

[51] Int. Cl.³ ............................................. G01K 5/64
[52] U.S. Cl. .................................................. 73/363.7
[58] Field of Search ................. 73/363.7, 363.9, 362.1; 116/221

[56] References Cited

U.S. PATENT DOCUMENTS

| | | | |
|---|---|---|---|
| 562,799 | 6/1896 | Broeker | 73/363.7 |
| 1,528,082 | 3/1925 | Schlaich | 116/221 |
| 2,771,775 | 11/1956 | Argabrite | 73/362.1 |
| 2,866,338 | 12/1958 | Muncheryman | 73/363.7 |

*Primary Examiner*—Donald O. Woodiel
*Attorney, Agent, or Firm*—Fay & Sharpe

[57] ABSTRACT

A thermometer having a short cup-shaped housing, an arcuately slotted top and an open bottom, the thermometer being used for sensing temperature on the surface of objects or room ambient temperatures in the event said surface temperature approximates the room ambient temperature. Extending into the inside of the housing is a centrally located member. The inside end of a bi-metallic element is mounted inside the housing eccentrically with respect to the centrally located member. A free end of the bi-metallic element is provided with a flanged or headed pin which is adapted to be captured by and float within a channel or slot extending radially outwardly from the outer edge of the annular ring such that expansions and contractions of the bi-metallic element are transmitted to and produce rotation of the annular ring. The channel portion extending radially outwardly from the annular ring has a flag member affixed thereto which is adapted to traverse the arcuate slot in the housing and register against temperature indicia on the outside of the housing. The thermometer is surface mounted by means of either a centrally located magnet or a fastener located centrally of the housing and the annular ring.

13 Claims, 15 Drawing Figures

U.S. Patent  Dec. 15, 1981  Sheet 1 of 2  4,305,289
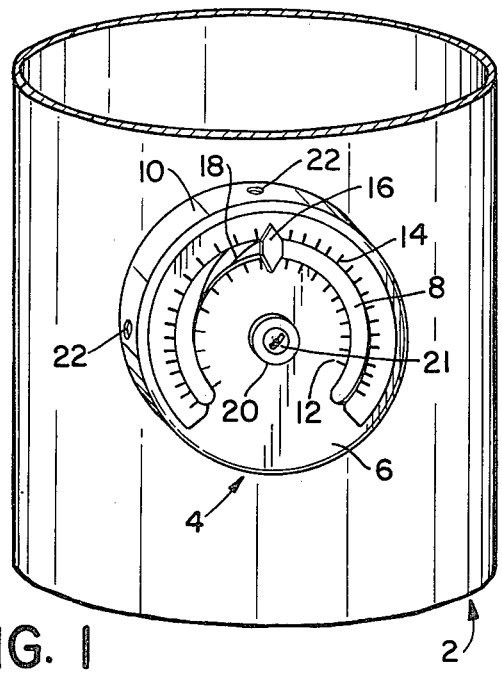
FIG. 1
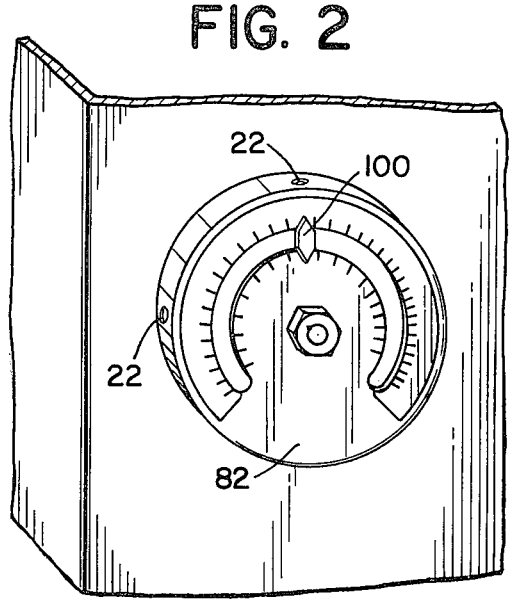
FIG. 2
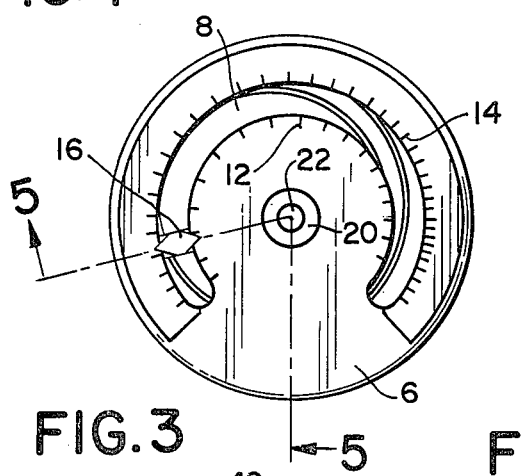
FIG. 3
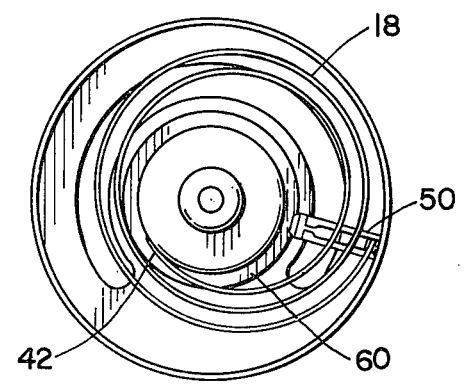
FIG. 4
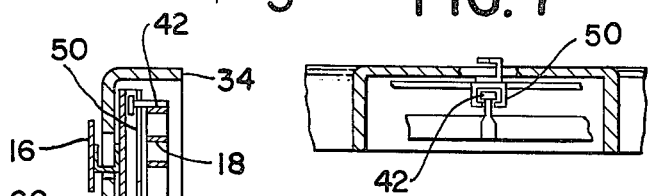
FIG. 7
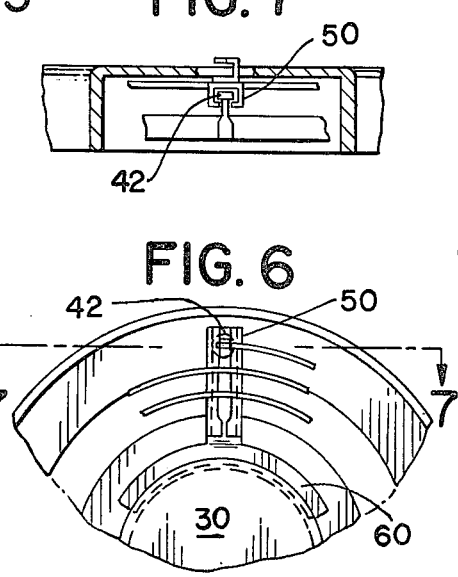
FIG. 5
FIG. 6
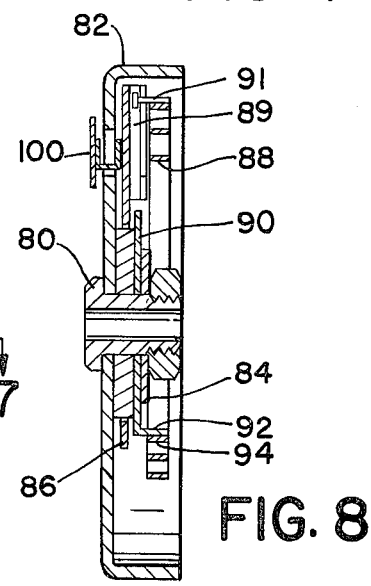
FIG. 8

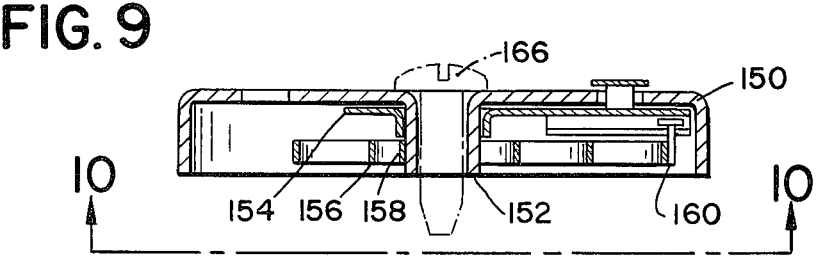
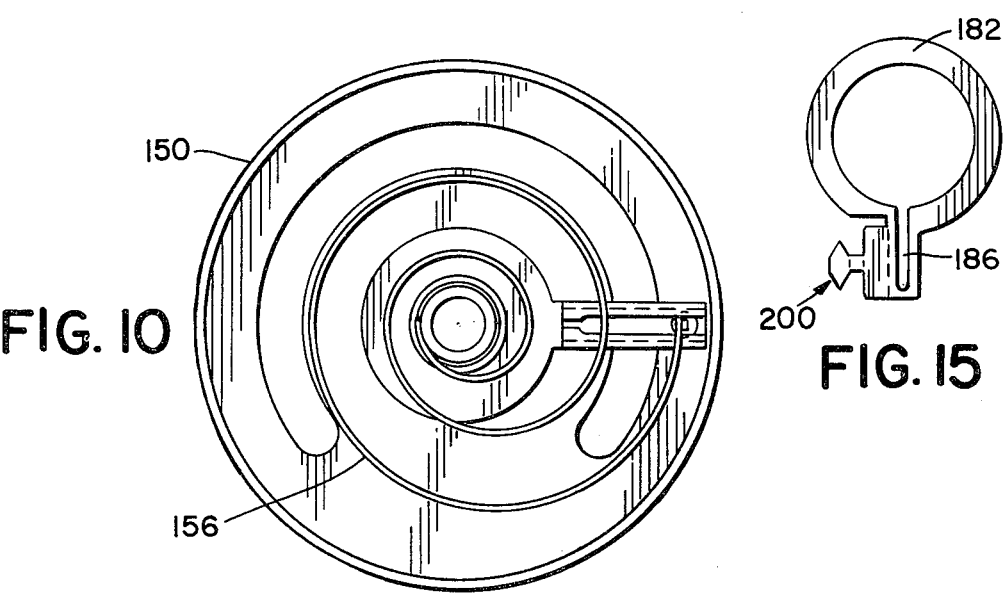
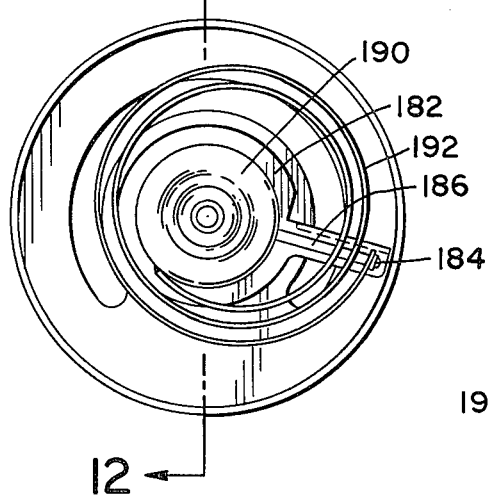
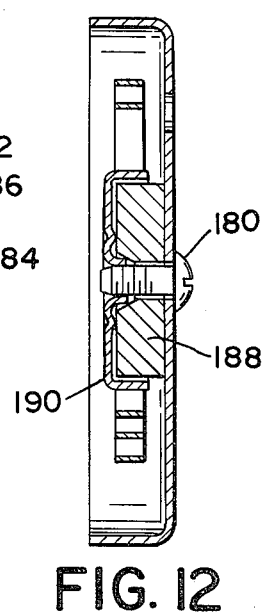
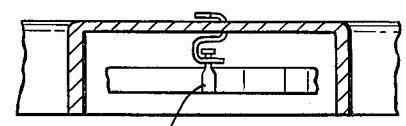
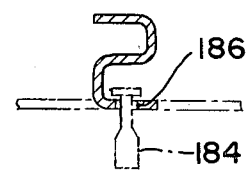

SURFACE MOUNTED THERMOMETER

BACKGROUND OF THE INVENTION

This invention relates to temperature indicating instruments. Such instruments are generally to be found in U.S. Patent Office classes relating to bracket supported thermometers having bi-metallic elements.

DESCRIPTION OF THE PRIOR ART

In the past it has been very difficult to provide a surface mounted thermometer that was both economical to make and was adaptable for universal mounting on variously configured surfaces. Many thermometers of the prior art were incapable of being mounted on a vertical surface, for instance, and a great deal of difficulty was encountered in mounting thermometers on cylindrical surfaces. In the past, various types of magnetic attachments have been employed as have various types of essentially permanent strapping or fastening methods. Also, in the case of magnetically mounted units, the magnets themselves contacted the hot surface to which the thermometer was applied and very quickly the magnets had a tendency to become demagnetized as the temperature approached the Curie point.

Additionally, in the prior art when it was desired to make use of a bi-metallic spiral-shaped temperature sensing element, one or the other of the ends of such element often crossed the midpoint of the casing thereby making it impossible to secure the thermometer to the surface being tested through such midpoint or central location. This meant that other means had to be employed which were either expensive, such as Alnico magnets mounted away from the center of the thermometer, or means which potentially interfered with or at least certainly did not enhance the operation of the unit itself.

It has also been found in surface-mounted thermometers that previous designs also made use of several permanent magnets which made the thermometer quite difficult to attach under certain circumstances. Thermometers having this type of attaching means were generally incapable of being universally mounted on a variety of differently shaped surfaces.

In addition, in the prior art, the case of the thermometer itself normally did not function as part of the magnetic circuit and thus the thermometer's holding power was not enhanced, thereby requiring larger or more powerful magnets to secure the thermometer to a surface. It has also been found that there has not been a great deal of effort in the prior art to separate the magnet from the hot surface thereby increasing its operating range. Even when Alnico magnets were used, which have a higher tolerance to elevated temperatures than ferrite magnets but are appreciably more expensive, they were so located that they heated quite quickly and sometimes lost their magnetism.

In the prior art, also, there appears to have been little attention paid to providing the magnet with a reflective surface in addition to an air gap, to reduce heat transfer by radiation and conduction.

SUMMARY OF THE INVENTION

In accordance with applicant's invention, there is provided a thermometer for surface mounting that is economical to make and functions over a wide temperature range without becoming disengaged from the surface on which it is mounted.

The thermometer is comprised of a casing which is generally cup shaped and normally open at the bottom. Provision is made for centrally locating either a magnet or a screw type fastener for securing the magnet to the surface on which it is to be mounted. Surrounding either one of these fastening means are the internal workings of the thermometer. A spriral-shaped bi-metallic strip is attached radially outwardly from the central mounting structure of the thermometer at one end. At the other end of the bi-metallic strip, a floating pin arrangement is located which is adapted to be captured by and float within a channel extending radially from the outer edge of a washer, of annular ring. The ring is positioned concentrically outwardly of but surrounds the fastening mechanism of the thermometer. The channel carries a pointer which is adapted to register against dials arranged about the inner and outer edges of an arcuate slot provided through the face of the cup-like housing or casing. Applicant has also provided for the application of reflective surfaces or discs between the surface on which the thermometer is placed and the magnet, which serves as a central fastener in one embodiment of the invention.

When a magnet is used as the central attaching feature for the thermometer, the thickness of the magnet is such that, with relation to the side wall of the casing, it is prevented from physically engaging the hot surface against which the thermometer rests. Thus, an air gap is provided which operates in conjunction with the other features of the thermometer to reduce the heat transferred from the hot surface to the magnet. This, in turn, permits the use of barium ferrite magnets which are relatively low in cost compared to Alnico magnets which have been employed in thermometers representative of the prior art. It also allows the thermometer to be used on and maintain its attachment to surfaces having higher temperatures at relatively less cost than was heretofore possible; or, it allows the range of operation of Alnico magnets to be considerably extended.

It is an object of applicant's invention that an air gap be employed, in conjunction with the previously mentioned reflective surface, to reduce the operating temperature of the magnet and thereby prevent or reduce loss of the magnet's holding power.

It is yet a further object of the applicant's invention to centrally locate a magnet such that forces are exerted not only by the magnet itself on the adjacent surface, but that the magnetic flux can easily flow through the low-reluctance path of the iron or steel housing and be focused, at high flux density, in an annular ring configuration at the edge of the case, thereby further increasing the magnitude of the magnetic forces holding the thermometer to the surface on which it is mounted.

Common to each embodiment of applicant's centrally mounted thermometer is the eccentric attachment of the inner end of a bi-metallic strip with respect to either the magnetic or the mechanical mounting structure. Also common to each of applicant's centrally mounted units is the annular ring with integral channel and pointer or flag which rotates around the magnet or central fastener of the thermometers.

It is thus an object of the applicant's invention to provide a surface-mounted thermometer that is economical to make, adaptable for universal mounting on a number of variously configured surfaces, and is able to withstand relatively high temperatures.

It is an object in one embodiment of applicant's invention to provide for a centrally located magnet which combines with the case of the thermometer to form a magnetic circuit and focusing system. It is yet a further object to space this magnet from the surface on which the thermometer is placed to thereby reduce the temperature of the magnet and increase its holding power. It is a further object of the invention, when a magnet is employed as the central feature, to provide a reflective surface to cooperate with the spaced arrangement of the magnet and the surface to further reduce the heat being transmitted from the surface being tested to the magnet itself.

It is a further object of the invention to locate one end of a bi-metallic spiral-shaped temperature sensing element eccentrically with respect to the fastening mechanism being employed.

It is yet another object of the invention to provide the other end of the bi-metallic strip with a pin designed to float in a channel for exerting rotational movement on an annular disc. It is yet a further object of the invention to provide an indicator carried on the channel that extends through the top portion of the thermometer casing and which is designed to read against temperature indicia on the face of the thermometer. It is still a further object of the invention to use a length of bi-metallic element which upon contraction, when hot, becomes less eccentric and more concentric with respect to the central mounting element of the thermometer casing. In the magnetically mounted version, it is still a further object to combine the length of the bi-metallic element with the floating pin arrangement to prevent contact of the element with the magnet which potentially could short the magnetic circuit, and also to eliminate binding which could produce faulty readings.

The foregoing and other objects of this invention will become more fully apparent from the following detailed description when read in conjunction with the accompanying drawings.

BRIEF DESCRIPTION OF THE DRAWINGS

FIG. 1 is a pictorial view of the magnetically held thermometer of applicant's invention in operating position on a pipe;

FIG. 2 is a pictorial view of the mechanically fastened thermometer of applicant's invention in operating position on a flat surface;

FIG. 3 is a front view in enlarged scale of applicant's magnetically held thermometer;

FIG. 4 is a rear view of the thermometer shown in FIG. 3;

FIG. 5 is a cross-sectional view along lines 5—5 of FIG. 3;

FIG. 6 is a fragmentary view, in enlarged scale, in the area of the thermometer channel assembly;

FIG. 7 is a view taken along line 7—7 of FIG. 6;

FIG. 8 is a cross-sectional side view of the mechanically fastened thermometer of FIG. 2;

FIG. 9 is a cross-sectional side view of an alternative embodiment of the mechanically fastened thermometer;

FIG. 10 is a view taken along long line 10—10 of FIG. 9.

FIG. 11 is a rear view of a variation of the magnetically fastened thermometer;

FIG. 12 is a view taken along line 12—12 of FIG. 11;

FIG. 13 is a cross-sectional view of one embodiment of a one-piece pointer assembly utilized in applicant's invention.

FIG. 14 is an enlarged cross-sectional view of the washer pointer assembly of FIGS. 11-13 and 15.

FIG. 15 is a front view of one version of the washer pointer assembly of FIGS. 11-14 before it is formed.

DESCRIPTION OF THE PREFERRED EMBODIMENT

Referring more particularly to the drawings wherein the showings are for the purpose of illustrating preferred embodiments of the invention only, and not for the purpose of limiting the same, FIG. 1 shows a flue pipe 2 on the surface of which is mounted the magnetically held thermometer 4 of applicant's invention. The thermometer itself is comprised of a casing 6 which defines an arcuate slot 8 on the top of the casing. The casing or housing 6 is cup-shaped and has a downwardly extending side wall 10. Around the edges of the arcuate slot 8 provision is made for the inclusion of one or more temperature indicia or dials 12 and 14.

It will be seen that extending through the arcuate slot is a temperature indicating member such as pointer or flag 16. Through the slot can be seen a portion of a bi-metallic element 18 which is responsive to temperature changes of the flue pipe.

A central connecting or support member 20 is located through the top of the casing and extends into the inside of the casing such that the internal workings of the thermometer surround it as it will be further explained.

The centrally located connector 20, which in the embodiment shown is a shoulder nut, or cap nut and bolt, preferably has an apertured center 21 so that a mechanical fastening member such as a screw may be inserted therethrough and into the flue pipe, stove top, or other hot surface, should it be desired to mechanically, as well as magnetically, fasten the thermometer to a surface. Use of a mechanical fastener, with the normally magnetically mounted unit, is a matter of choice, as in most instances the magnet is sufficient to secure the thermometer to the surface as will be further explained.

It will be noticed also that a secondary, or non-centrally located, mounting aperture 22 has been provided in the side wall of the housing or casing 6. If desired, a safety wire (not shown) can be inserted through this aperture, wrapped around the flue pipe and inserted in a corresponding and opposing aperture (not shown) in the casing wall.

Thus, in effect, there are three distinct means of mounting applicant's thermometer, two of which are central to the internal workings of the thermometer and one of which is external or radially outwardly spaced from the internal workings.

In most cases, however, the safety wire designed for insertion through the apertured side walls of the casing would not be necessary.

Referring now to FIG. 5, which depicts the magnetically mounted embodiment of the invention and is a view taken along line 5—5 of FIG. 3, it will be seen that the central connecting member 20 extends outwardly from the top wall a sufficient distance to protect the temperature indicating member 16 should the thermometer be inadvertently dropped on its top. The connecting member may be a shoulder nut or any suitable member for connecting the inner workings of the thermometer to the outer casing.

It can be seen also that on the inside of the casing, and secured thereto by the connecting member 20, is a cup-shaped washer 30 of non-magnetic material. Lying between the cup washer 30 and the inner face of the casing is a magnet 32 which, due to the design of applicant's invention, may be of the barium ferrite type. It is, of course, to be understood that an Alnico magnet could be used in place of a barium ferrite magnet but the cost of Alnico magnets is relatively high as compared to that of barium ferrite magnets. The type of magnet used is a matter of choice; however, due to applicant's design, utilization of the less expensive magnet is often all that is necessary to secure the thermometer to a surface.

It can be seen in FIG. 5 that the edges 34 of the cup-shaped housing extend downwardly from the top wall further than either the cup-shaped washer 30 or the magnet 32 and thus when the thermometer is placed or oriented in its position of use there is an air space 36 between the surface on which the thermometer is placed and the magnet itself. This spacing helps to keep the magnet cooler than if it were to directly contact the hot surface which is being monitored.

A reflective coating can be applied to the cup washer or the cup washer simply may be made of a material that is reflective to infrared energy to further aid in keeping the magnet cool. The magnet itself may be coated with highly reflective material to further reduce radiant heat transfer. It should be understood that this is desirable, due to the fact that as the temperature of a magnet is increased, its holding power is decreased. A reflective coating may also be applied to the interior of the housing (6) itself to reduce radiant heat transfer to the inside of the case and hence, by conduction through the case and into the magnet. It is preferable to keep the magnet as cool as possible and certainly from reaching its Curie point which would potentially cause permanent loss of magnetism. As a further means of accomplishing this objective, the heat reflective means is situated substantially midway between the magnet and the hot surface on which the housing is mounted when the housing is oriented in its position of use.

Further referring to FIG. 5, and as can be seen also in FIG. 4, the bi-metallic spiral coil or temperature sensing element 18 is attached eccentrically with respect to the central connecting member 20; the point of attachment of the internal end of the coil in the magnetically mounted embodiment of applicant's invention being at point 42 on the cup washer 30.

The other end of the bi-metallic spiral coil is attached to a pin or driving member 42. This driving member, which preferably is flanged or has a head at one end, engages a channel member 50 on which is mounted the temperature indicating member 16. Both the channel and the temperature indicating member extend radially outwardly from the outer periphery of an annular ring 60. The substantially annular member 60 is mounted between the cup washer and the casing for rotational movement about the central axis of the thermometer which it substantially surrounds.

Thus, it will be seen that the working elements of the thermometer lie radially outwardly from the connecting or support means which is inserted through the centrally apertured casing at point 70 and the centrally apertured cup washer at point 72.

The bi-metallic element is eccentrically mounted in order to more readily accommodate the central fastening feature of the invention.

It can be seen also that although applicant has shown a cup washer 30 having a centrally apertured bottom oriented such that the open end of the cup washer and the open bottom of the casing or housing face each other, it may be desirable in some situations to replace the cup washer 30 with a simple washer or retaining means which is merely flat but nonetheless serves to secure the magnet inside the housing. In such case, the flat washer may be provided, if desired, with a reflective surface for reduction of heat transfer to the magnet.

It is desirable to use suitable ferromagnetic metal for the casing so that the casing itself becomes part of the magnetic circuit which serves to hold the thermometer to the surface. For example, note that one flat surface of the magnet is, for example a north pole. The other flat surface, which is contiguous or in a magnetic circuit with the inner face of the housing or casing, is a south pole. Thus, the magnetic forces are transferred from the magnet through the case causing the entire case, and especially its circular edge, to become the south pole. Thus, magnetic holding power is enhanced. It will be appreciated, of course, that if desired the magnet may be separated from the casing by steel washers or the like but the theory and operation of the unit would remain the same.

As previously mentioned, it is possible to place a screw-type fastener through the hollow shoulder nut to provide additional holding means in the normally magnetically held embodiment of applicant's invention.

A slight variation in the magnetically held embodiment of applicant's thermometer is explained most readily with reference to FIGS. 11 to 15. In this variation, it will be seen that a self-tapping screw 180 is employed, rather than a cap nut, as the connecting member for the internal elements of the thermometer. In this variation, it will also be seen that a slightly different washer-pointer assembly 182 has been employed. The washer-pointer assembly is a one-piece or unitary construction that is engaged by pin 184 through slot 186. It will be appreciated that the pin is prevented from disengaging the drive slot by the magnet 188 and cup 190 upon heating of the thermometer and contraction of the spiral coil 192.

It can be seen also that, as opposed to the welded construction of the washer-pointer assembly previously explained, this variation of applicant's invention employs a one-piece stamping for the washer-pointer assembly which, of course, is a cost-saving factor. The stamping, before forming, is substantially as shown in FIG. 15. The tab portion 200 is folded as indicated by dotted lines into an S-shaped configuration readily seen in FIG. 14.

It will be understood that either the welded washer-pointer construction or the unitary construction are suitable for use in the thermometer of applicant's invention.

It may be preferable when using a centrally fastened unit to employ a second embodiment of applicant's invention which is explained most readily with reference to FIG. 8.

In the embodiment shown in FIG. 8, which is mechanically held to a surface, it will be noted that there is also no central stem or central portion or post through which the bi-metallic strip is attached. Rather, a centrally located member 80 is provided which extends through the apertured casing 82 and surroundings which are the internal workings of the thermometer. It will be appreciated that in this embodiment a spacer or washer 84 is employed lying adjacent the inner surface of the top wall of the housing. Surrounding member 84 is annular ring 86 which lies substantially concentric with but radially outward from the central fastener. This ring is designed to have rotational movement imparted to it through channel 89, driven by pin 91, carried on temperature responsive element 88.

The annular ring 86 is sandwiched between tab washer 90 and the inner face of the casing just as the annular ring of the magnetically fastened embodiment is sandwiched between the cup washer 30 and the inner face of the casing.

It will be seen that the tab 92 of tab washer 90 is extended in such a manner as to provide easy attachment of the bi-metallic strip at point 94. This attachment may be accomplished by any convenient means such as welding and the like, and is situated such that the spiral temperature sensing element is mounted in an eccentric relationship with respect to the central connecting means.

To the other end of the bi-metallic coil, as mentioned previously, is attached pin member 91.

FIGS. 9 and 10 depict an alternative embodiment of applicant's mechanically mounted thermometer. It will be seen that case or housing 150 is provided with an extruded center portion 152 around which annular ring 154 is mounted. In this embodiment, the centrally located extrusion serves as a connecting means. The bi-metallic coil 156 is welded to the centrally located member at point 158 so that the annular washer-pointer assembly floats above, rotates and is held up by the spiral bi-metallic coil. Thus, the coil serves as a retaining means. In this embodiment, the drive pin 160 is welded to the outside end of the bi-metallic coil in the same type of channel and pointer driving arrangement as is characteristic of applicant's other embodiments.

This alternative embodiment of the mechanically mounted thermometer is secured to a surface by means of a screw or fastener 166 which is located centrally of the internal workings of the thermometer.

In both the magnetically and mechanically attached embodiments of applicant's invention the bi-metallic strip tends to become more and more concentric with the central axis of the thermometer as it contracts due to heat. Also, in each embodiment, and in order to accommodate the less than perfect circle that is described by the outer end of the bi-metallic strip, a channel is provided in which the pin at the outer end of the bi-metallic spiral coil can float.

Thus, it will be appreciated that the movement of the bi-metallic strip is transmitted through the pin secured to its outer end to the channel member in which the pin is captured. This movement, in turn, imparts rotational movement to the annular ring and channel integral with it. The indicating member, being mounted on the channel is thus responsive to movement of the bi-metallic element such that temperature is registered against the temperature indicia on the periphery of the arcuate slot through the casing.

It should be understood that each embodiment of applicant's invention may be mounted on surfaces of varying configurations and due to the central attaching feature the thermometer may essentially be universally mounted on any type of surface. It should be noted, especially in reference to the magnetically mounted embodiment of applicant's thermometer, that when such thermometer is mounted on a cylindrical surface only two points of the casing contact the surface. This provides for a very small area in which heat may be conducted to the housing and transferred to any working part of the thermometer, and also provides very high, magnetic flux density which is very effective in developing high holding force. This very high flux density at the two points where the case contacts a cylindrical surface, or the entire circular edge of the case when mounted on flat surfaces, produces high magnetic forces and utilizes a given amount of magnet most effectively. The symmetrial nature of the flux field furthermore, for either flat or cylindrical surfaces, produces a highly uniform and stable holding pattern such that the thermometer is not easily dislodged.

It will further be appreciated that in the situation under discussion the temperature of the surface under investigation is disturbed only slightly compared with units that contact the surface over a larger area than the two points on the case.

The contact at the two points presents a relatively small cross-section to heat transfer by conduction, reducing heat transfer to the case, and hence, to the magnet. It is desired when utilizing the magnetically mounted embodiment, to keep the magnet cool.

Each embodiment of applicant's invention has thus been described in great detail sufficient to enable one of ordinary skill to make and use the same. Obviously, modifications and alterations in the preferred embodiments will occur to others upon a reading and understanding of the specification. All such alterations are to be considered as part of the invention, insofar as they come within the scope of the claims.

I claim:

1. In a thermometer for mounting on a surface and having a housing and magnetic means for attaching said housing to said surface the improvement comprising:
    an annular ring disposed and rotatably secured within said housing substantially concentric to said mounting means;
    means for indicating temperature cooperating with said annular ring;
    a temperature responsive member for imparting rotational movement to said annular ring and said means for indicating temperature, said temperature-responsive member being secured within said housing radially outwardly from and substantially surrounding said mounting means.

2. In a thermometer for mounting on a surface and having a housing and mounting means for attaching said housing to said surface the improvement comprising:
    an annular ring disposed and rotatably secured within said housing substantially concentric to said mounting means;
    means for indicating temperature cooperating with said annular ring;
    a bi-metallic spiral coil for imparting rotational movement to said annular ring and said means for indicating temperature, said temperature responsive member being secured at its inner end within said housing radially outwardly from and substantially surrounding said mounting means.

3. The thermometer of claim 2, wherein said mounting means comprises a connecting member and a fastener centrally oriented with respect to said connecting member for securing said housing to said surface.

4. In a thermometer for mounting on a surface and having a housing and mounting means comprising an apertured shoulder nut and bolt having a fastener inserted therethrough for attaching said housing to said surface the improvement comprising:
    an annular ring disposed and rotatably secured within said housing substantially concentric to said mounting means;

means for indicating temperature cooperating with said annular ring;

a temperature responsive member for imparting rotational movement to said annular ring and said means for indicating temperature, said temperature-responsive member being secured within said housing radially outwardly from and substantially surrounding said mounting means.

5. In a thermometer for mounting on a surface and having a housing and magnetic mounting means spaced from said surface for attaching said housing to said surface the improvement comprising:

an annular ring disposed and rotatably secured within said housing substantially concentric to said mounting means;

means for indicating temperature cooperating with said annular ring;

a temperature responsive member for imparting rotational movement to said annular ring and said means for indicating temperature, said temperature-responsive member being secured within said housing radially outwardly from and substantially surrounding said mounting means.

6. In a thermometer for mounting on a surface and having a housing and a magnet for attaching said housing to said surface the improvement comprising:

an annular ring disposed and rotatably secured within said housing substantially concentric to said mounting means;

means for indicating temperature cooperating with said annular ring;

a temperature responsive member for imparting rotational movement to said annular ring and said means for indicating temperature, said temperature-responsive member being secured within said housing radially outwardly from and substantially surrounding said mounting means; and, reflective means situated substantially midway between said magnet and the surface on which the housing is mounted when the housing is oriented in its position of use.

7. A surface mounted thermometer comprising:

a cup-shaped centrally apertured casing having an arcuately slotted top and an open bottom;

a cup washer having a centrally apertured bottom and an open top oriented such that the open top of said cup washer and the open bottom of said casing face each other;

connecting means for joining said cup washer and said casing, said means extending through the central apertures of said cup washer and said casing;

a magnet for mounting said casing on a surface, said magnet being sandwiched within and between said cup washer and said casing and disposed radially outwardly from said connecting means;

a substantially annular member concentrically surrounding said connecting means and rotatably secured between said cup washer and the top of said casing;

a channel for transferring substantially rotational movement to said substantially annular member, said channel being integral with said annular member;

a bi-metallic element within said casing mounted eccentrically with respect to said connecting means and floatingly engaging said channel such that movement of the bi-metallic element is transmitted to said channel member thereby producing rotation of the substantially annular ring;

a temperature indicating member being carried on said channel and adapted to traverse the arcuate slot defined by the top wall of the casing.

8. The thermometer of claim 7 further comprising a reflective surface on said cup washer and including secondary mounting means for engaging said casing.

9. A surface mounted thermometer comprising:

a housing defining a chamber having a top wall adapted to provide temperature indicia;

an annular ring disposed within said chamber;

support means for rotatably mounting said annular ring inside said chamber, said support means engaging said top wall and extending into said chamber;

a temperature responsive means for imparting rotation to said annular ring and being mounted eccentrically inside said chamber with respect to said support means;

means for mounting said housing on a surface, said means being centrally disposed with respect to said annular ring;

a channel extending radially outwardly from the periphery of said annular ring;

a channel engaging member driven by said temperature responsive means and being adapted for floating engagement with said channel; and, a temperature indicating member being responsive to movements of said annular ring and adapted to register temperature against said temperature indicia.

10. A surface mounted thermometer comprising:

a housing defining a chamber having a top wall adapted to provide temperature indicia;

an annular ring disposed within said chamber;

means for mounting said housing on a surface, said means being centrally disposed with respect to said annular ring, and comprising a hollow shoulder nut and a fastener inserted therethrough for mounting engagement with said surface;

support means for rotatably mounting said annular ring inside said chamber, said support means engaging said top wall and extending into said chamber;

a temperature responsive means for imparting rotation to said annular ring and being mounted eccentrically inside said chamber with respect to said support means;

a temperature indicating member being responsive to movements of said annular ring and adapted to register temperature against said temperature indicia.

11. A surface mounted thermometer comprising:

a housing defining a chamber having a top wall adapted to provide temperature indicia;

an annular ring disposed within said chamber;

means for mounting said housing on a surface, said means being centrally disposed with respect to said annular ring and comprising a hollow member having a fastener inserted therethrough for mounting engagement with said surface;

support means for rotatably mounting said annular ring inside said chamber, said support means engaging said top wall and extending into said chamber;

a temperature responsive means for imparting rotation to said annular ring and being mounted eccentrically inside said chamber with respect to said support means;

a temperature indicating memeber being responsive to movements of said annular ring and adapted to register temperature against said temperature indicia.

12. A surface mounted thermometer comprising:

a housing having a top wall adapted to provide temperature indicia;

an annular ring disposed under said top wall;

support means for rotatably mounting said annular ring under said top wall, said support means being secured to said top wall;

a temperature responsive means for imparting rotation to said annular ring and being mounted under said top wall and eccentrically with respect to said support means;

means for mounting said housing on a surface, said means being centrally disposed with respect to said annular ring;

a channel extending radially outwardly from the periphery of said annular ring;

a channel engaging member driven by said temperature responsive means and being adapted for floating engagement with said channel; and, a temperature indicating member being responsive to movements of said annular ring and adapted to register temperature against said temperature indicia.

13. A surface mounted thermometer comprising:

a housing having a top wall adapted to provide temperature indicia;

a driven member disposed under said top wall;

support means for rotatably mounting said driven member under said top wall, said support means being secured to said top wall;

a temperature responsive means for imparting rotation to said driven member, said means being mounted eccentrically with respect to said support means;

means for mounting said housing on a surface;

a channel communicating with and being positioned radially outwardly from the periphery of said driven member;

a channel engaging member driven by said temperature responsive means and being adapted for floating engagement with said channel; and, a temperature indicating member being responsive to movements of said driven member and adapted to register temperature against said temperature indicia.

* * * * *